United States Patent
Olson, Sr. et al.

[15] 3,653,332
[45] Apr. 4, 1972

[54] CONVERTIBLE RAIL-HIGHWAY VEHICLE

[72] Inventors: Buford W. Olson, Sr.; Eldrid W. Nelson; Albin A. Davidson, all of Minneapolis, Minn.

[73] Assignee: Chas. Olson & Sons Incorporated, Minneapolis, Minn.

[22] Filed: Feb. 12, 1970

[21] Appl. No.: 10,893

[52] U.S. Cl. ..........................105/215 C, 104/242, 104/245
[51] Int. Cl. ................B61d 15/00, B61f 9/00, B62d 61/12
[58] Field of Search..........................105/215 C; 104/242, 245

[56] References Cited

UNITED STATES PATENTS

| | | | |
|---|---|---|---|
| 2,482,564 | 9/1949 | Townsend | 105/215 C |
| 2,110,230 | 3/1938 | Main | 105/215 C |
| 2,116,786 | 5/1938 | Gross | 105/215 C |
| 1,543,452 | 6/1925 | Seitz et al. | 105/215 C |
| 3,263,628 | 8/1966 | Grove et al. | 105/215 C |
| 2,006,781 | 7/1935 | Winkley | 105/215 C |

Primary Examiner—Arthur L. La Point
Assistant Examiner—Howard Beltran
Attorney—H. Dale Palmatier

[57] ABSTRACT

Guide wheel assemblies mountable on a highway vehicle for movement between a retracted position and a rail travel position to guide the vehicle while the vehicle's flangeless wheels provide the driving power. Each embodiment of the guide wheel assemblies includes a left and a right guide wheel subframe mounted for independent pivotal movement about a first transverse shaft, a second transverse pivot member, an overcenter lock assembly operated by the second member between the retracted and rail travel positions, and drive mechanism for pivoting the second member. In one embodiment the overcenter lock mechanism is connected to a transverse load transfer member having opposite ends pivotally connected to the adjacent subframe through a resilient mount and in a second embodiment the load transfer member provides an extensible connection having opposite ends connected to the adjacent subframe to pivot about a diagonal axis. In the third embodiment there is provided two overcenter lock assemblies, each being pivotally connected to the adjacent subframe. Also one of the embodiments includes mechanism for blocking the use of the vehicle steering mechanism for steering the vehicle. Also there is provided mechanism for properly aligning the first pivot shaft relative the vehicle.

7 Claims, 12 Drawing Figures

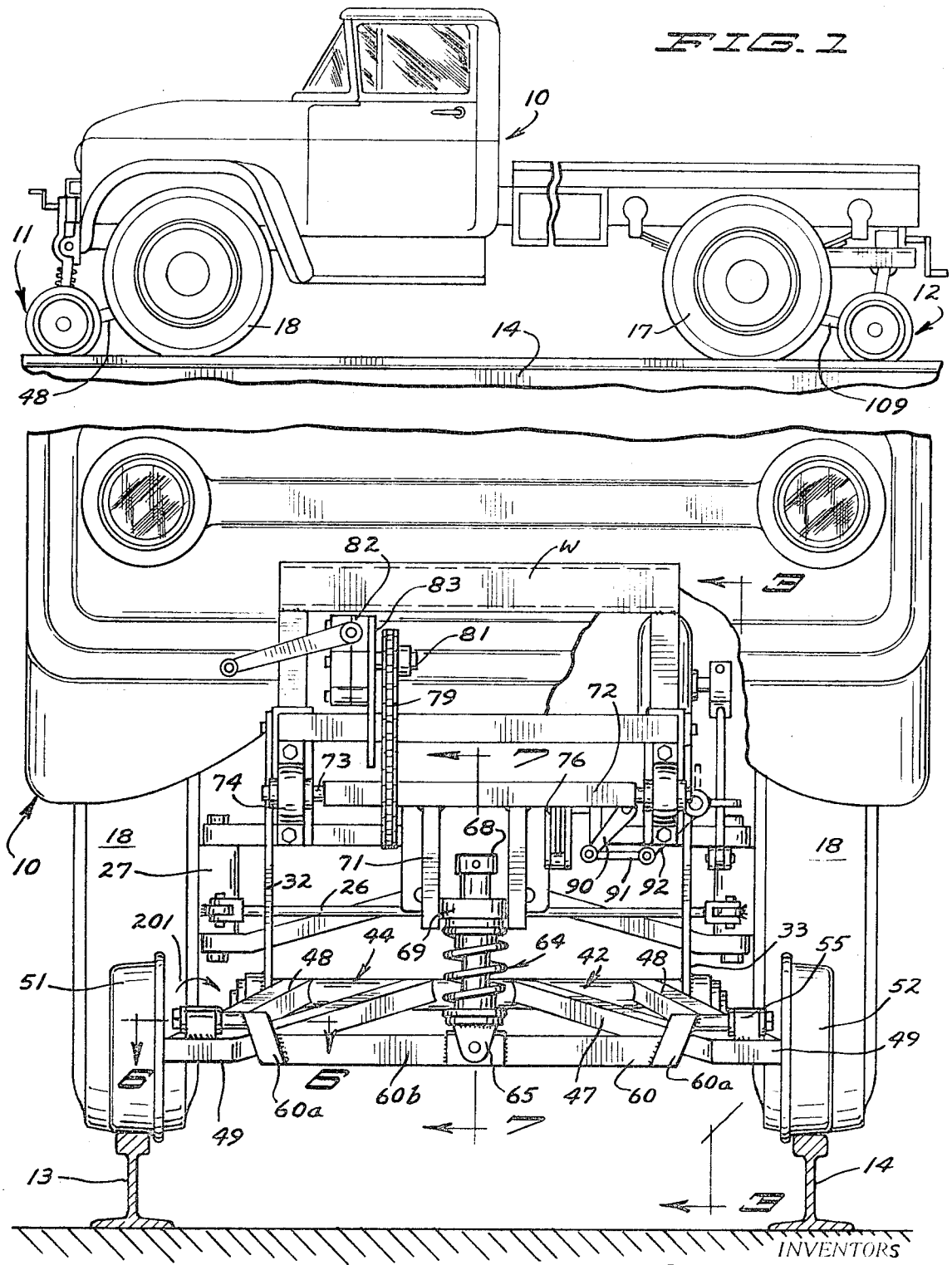

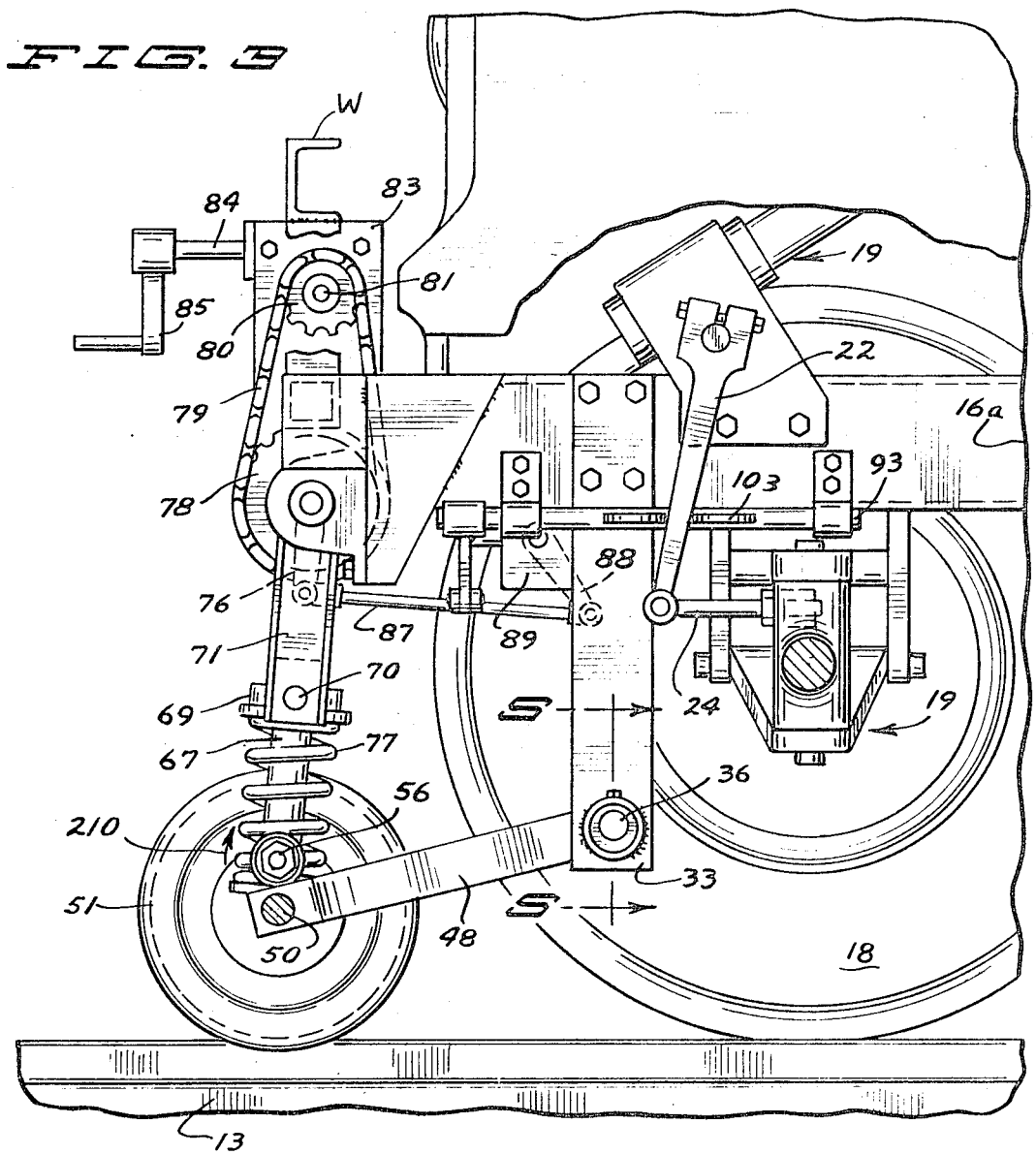
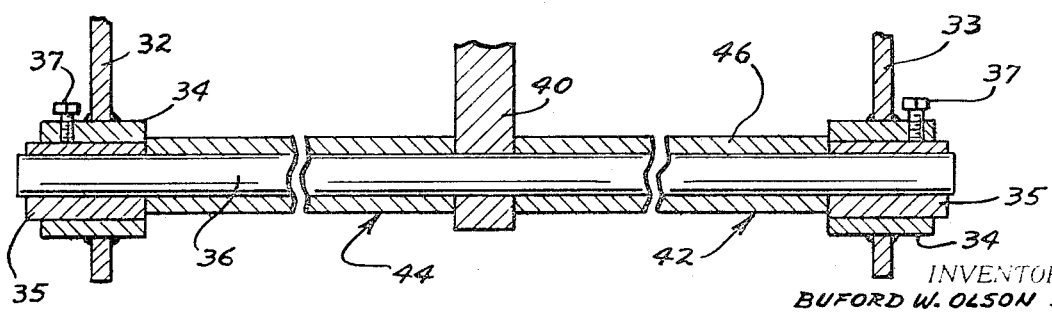

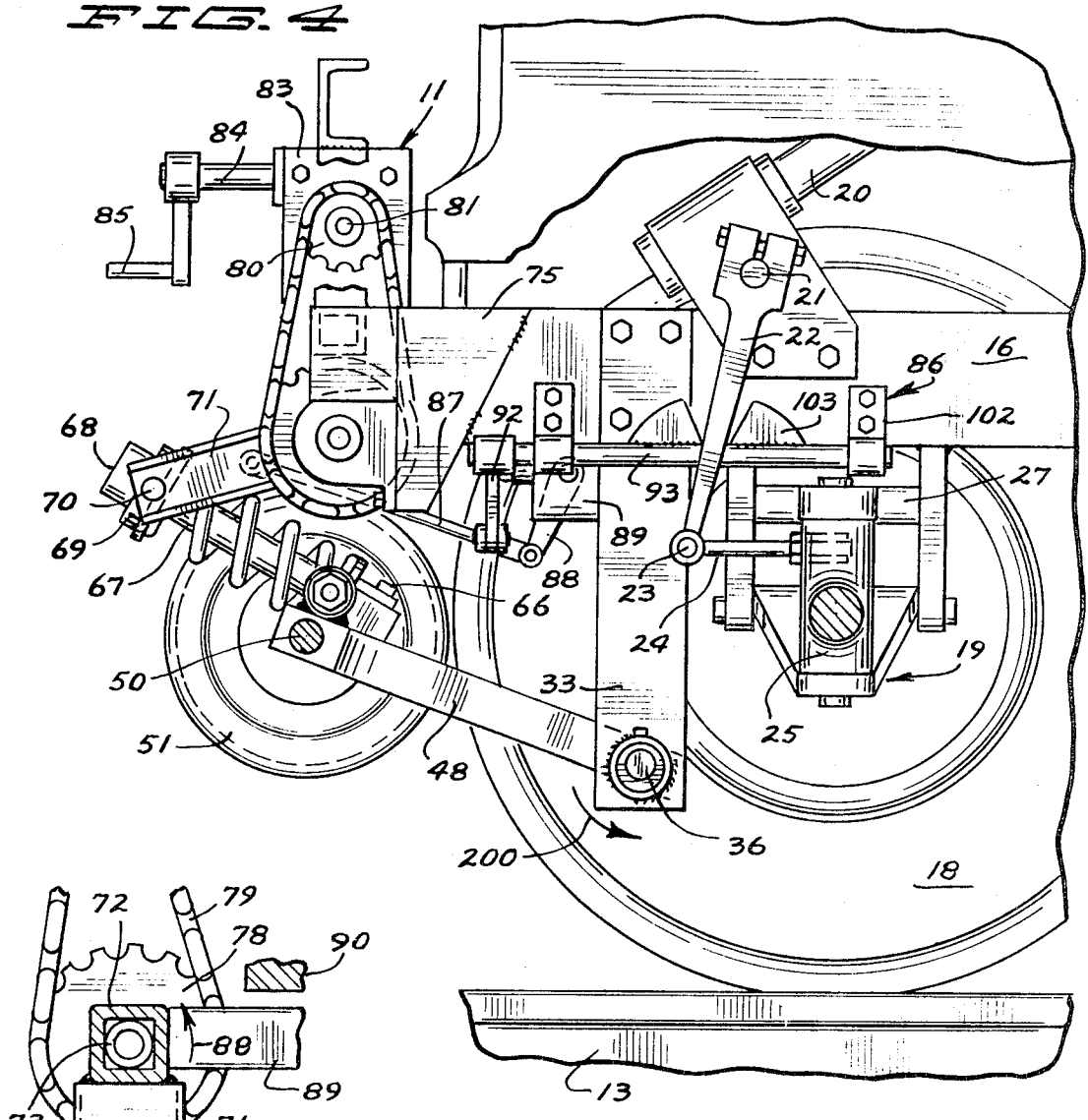
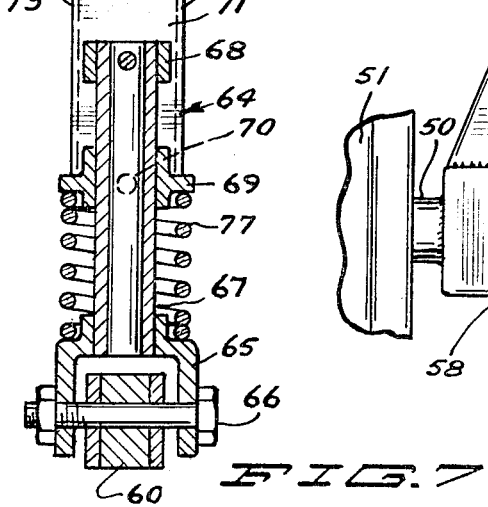
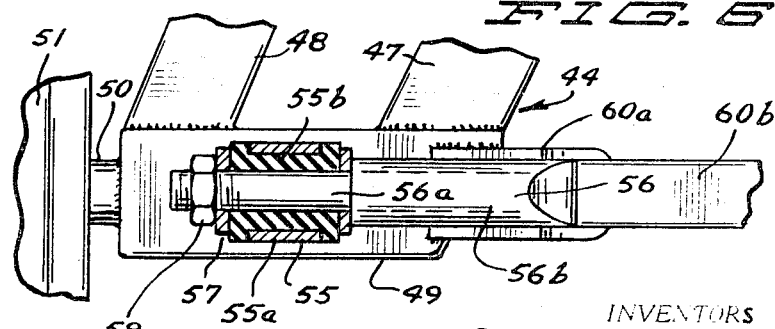

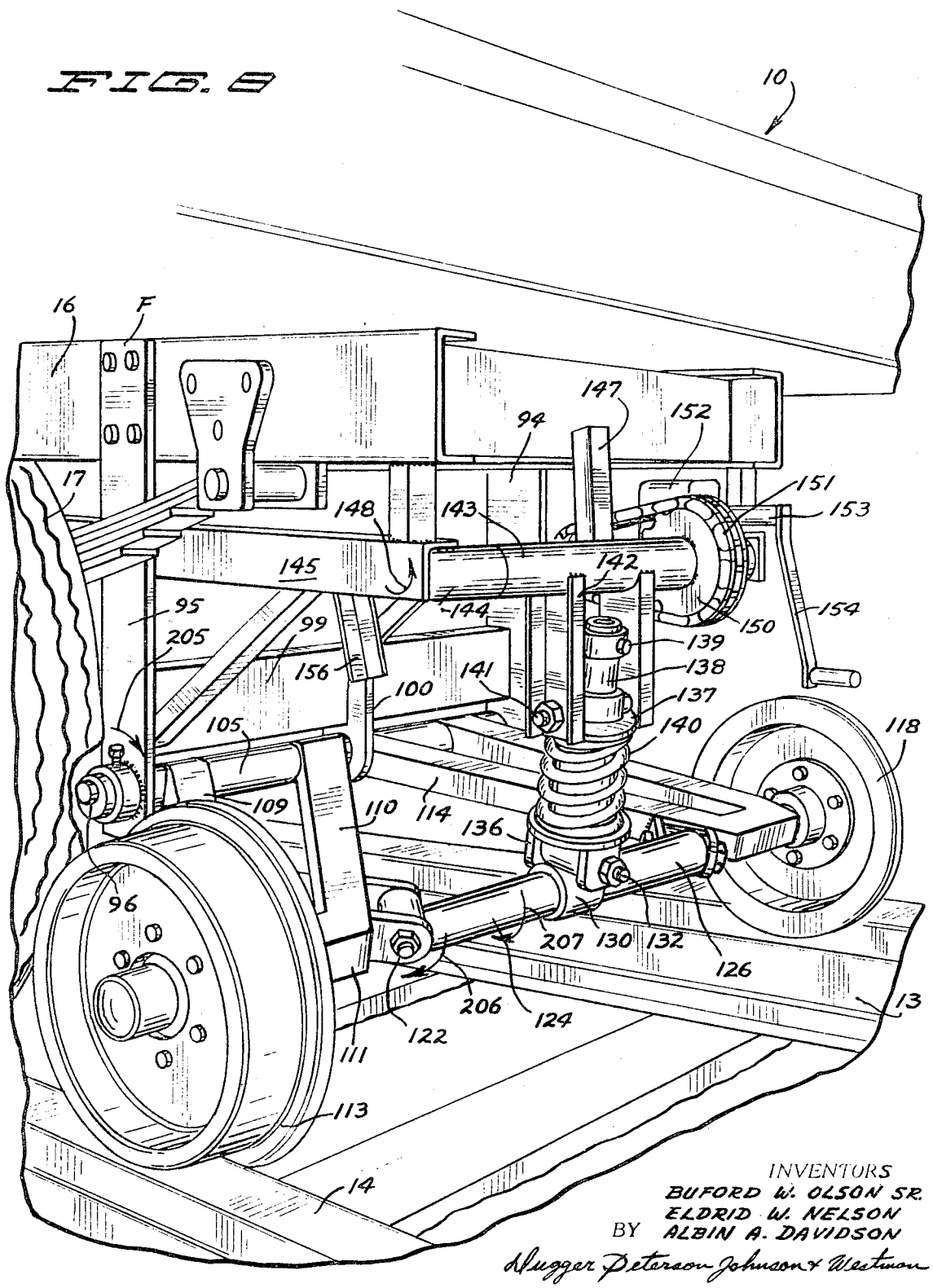

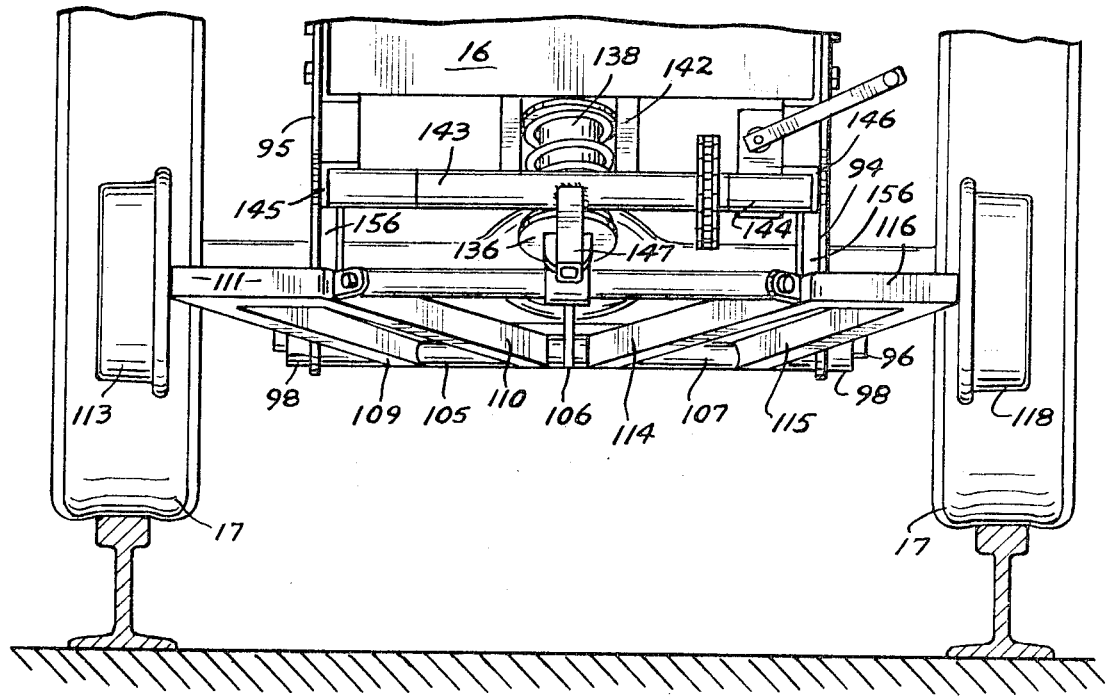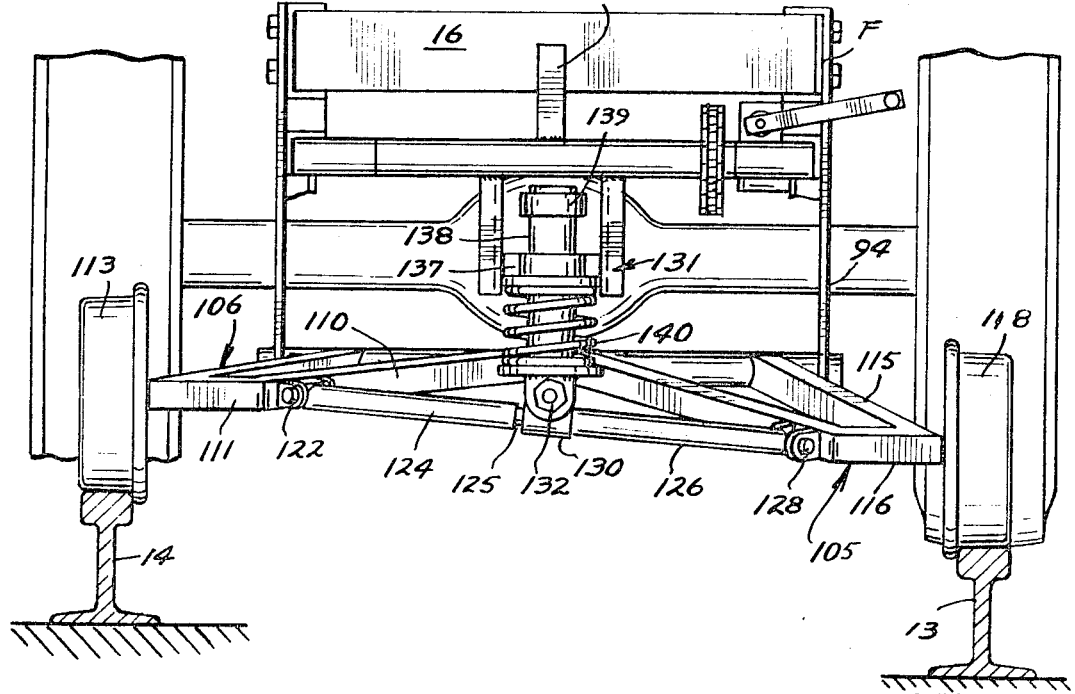

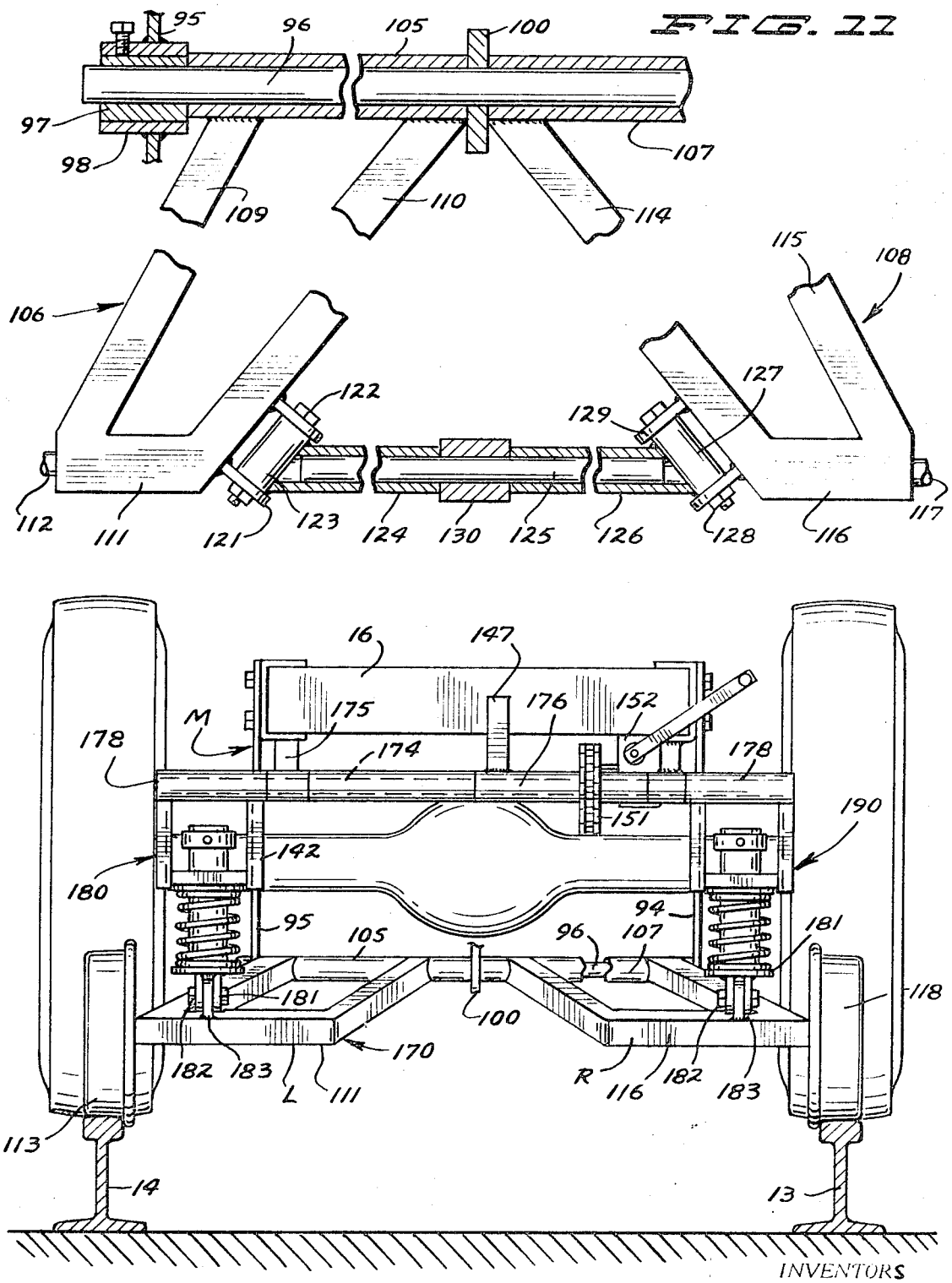

3,653,332

CONVERTIBLE RAIL-HIGHWAY VEHICLE

BACKGROUND OF THE INVENTION

Guide wheel assemblies for highway vehicles that are used when the vehicle is to travel along railroad tracks to guide the vehicle along the tracks. In the prior art, for example U.S. Pat. No. 2,986,102, guide wheels are mounted for limited independent movement, however there is no suggestion of an overcenter lock mechanism to retain the wheels in a rail travel position, or such mechanism for retaining the guide wheels in either a rail travel or a highway travel position.

SUMMARY OF THE INVENTION

Flanged guide wheel assemblies for a highway vehicle that includes transversely spaced guide wheels mounted by the subframes for pivotal movement about a first transverse axis, and overcenter lock apparatus connected to the subframes a substantial distance from said axis for moving the guide wheels between a raised highway travel position and a lowered, overcentered, locked, rail travel position.

One of the objects of the invention is to provide new and novel guide wheel assemblies for a highway vehicle that are retractable by and releasably retained in a rail travel position by overcenter lock mechanism. In furtherance of the above mentioned object, it is another object of the invention to provide adjustable eccentric mounting mechanism for a shaft that mounts the guide wheels of each assembly for pivotal movement between retracted and rail travel positions.

An additional object of this invention is providing in guide wheel assemblies for adapting a highway vehicle to rail travel, new and novel mechanism for aligning the guide wheels. In furtherance of the last mentioned object, it is still another object of the invention to provide new and novel eccentric mounting mechanism on opposite ends of a common pivot shaft for a pair of transversely adjacent guide wheel subframes for adjusting the fore and aft positions of the guide wheels to properly align the guide wheels.

A further object of this invention is to provide new and novel mechanism mounting each of rail travel guide wheels for independent suspension on a highway vehicle. An additional object of this invention is to provide on a highway vehicle, guide wheel assemblies adapting the vehicle for rail travel that includes new and novel mechanism for mountingly suspending transversely adjacent guide wheels from the vehicle frame, permitting one of said guide wheels in a rail travel position moving a limited amount independent of the other and retain both guide wheels in engagement with the rails even though there are variations in elevation of the transversely opposite portions of the two rails. A different object of the invention is to suspendingly mount rail travel guide wheels on a highway vehicle in a rail travel position for limited independent movement in a generally vertical direction while bracing the guide wheels against fore and aft movement.

Another object of this invention is to provide new and novel guide wheel assemblies for a highway vehicle that are releasably retained in an overcenter locked, rail travel position and at the same time are resiliently urged to remain in contact with the rails. In furtherance of the last mentioned object, it is still another object of this invention to mount a pair of transversely spaced guide wheels for independent movement about a first axis and connecting the guide wheels together for limited pivotal movement about said first axis at a location spaced from the first axis and applying a loading force to said wheels in the rail travel position at a location spaced a substantial distance from said first axis.

BRIEF DESCRIPTION OF THE DRAWINGS

FIG. 1 is a side view of a vehicle having the front and rear guide wheel assemblies of this invention in a position to ride on railroad track rails;

FIG. 2 is a fragmentary front view of the structure in FIG. 1 showing one embodiment of the invention in its rail travel position;

FIG. 3 is a fragmentary cross sectional view generally taken along the line and in the direction of arrows 3—3 of FIG. 2 other than the overcenter lock assembly is shown just prior to being operated to an overcenter locked position;

FIG. 4 is a view corresponding to FIG. 3 other than the front guide wheel assembly is shown in a retracted highway travel position;

FIG. 5 is a fragmentary cross sectional view generally taken along the line and in the direction of arrows 5—5 of FIG. 3 to show adjustment mechanism for aligning the front guide wheels relative to the vehicle frame to properly track on the rails;

FIG. 6 is a fragmentary view, part in cross section, that is generally taken along the line and in the direction of arrows 6—6 of FIG. 2 to illustrate the connection of the front assembly load transfer bar to a guide wheel subframe;

FIG. 7 is a longitudinal cross sectional view generally taken along the line and in the direction of the arrows 7—7 of FIG. 2 other than the overcenter lock assembly is shown just prior to being operated to its overcenter lock position;

FIG. 8 is a fragmentary perspective view of the rear end portion of the vehicle, said view showing a second embodiment of the guide wheel assembly in a lowered overcenter locked, rail engaging position;

FIG. 9 is a rear view of the structure of FIG. 8, other than the guide wheel assembly is shown in a retracted position;

FIG. 10 is a rear view of the structure of FIG. 8 wherein one rail is at a higher elevation than the other, the difference in elevation of the rails being exaggerated for purposes of illustrating that one rear guide wheel is pivotable independently of the other about a common pivot axis;

FIG. 11 is a fragmentary view of a portion of the structure for mounting the guide wheels of the assembly of FIG. 8, portions of said view being shown in cross section; and FIG. 12 is a rear view of a third embodiment of the guide wheel assembly of this invention.

Referring now in particular to FIG. 1, the vehicle 10, which for purposes of illustrating the invention is shown as being a truck, has a front guide wheel assembly, generally designated 11, mounted on the front end thereof and a rear guide wheel assembly, generally designated 12; the assemblies 11 and 12 being shown in a lowered overcenter locked position for running on the rails 13, 14 of a railroad track. The vehicle has a body frame 16, rear flangeless road wheels 17, front flangeless road wheels 18, and conventional mechanism, generally designated 19 to mount the wheels 18 on the frame and steer the front road wheels. Since the mechanism 19 is conventional, it is only partially illustrated in the drawings and will only be briefly described herein. The mechanism 19 includes a steering column 20 having internal mechanism for pivoting the shaft 21, one end of the pitman arm 22 being connected to the shaft 21 to rotate therewith. The opposite end of arm 22 is pivotally connected at 23 to the link 24 that in turn is pivotally connected to the pivotally mounted wheel mounting and steering member 25. A tie rod 26 pivotally connects member 25 to the corresponding member 27 for the right front wheel.

Referring now in particular to FIGS. 2-4 horizontally intermediate the front end of the frame 16 and the front axle of the vehicle, a frame member 33 of the framework W of the assembly 11 is dependingly secured to the longitudinally extending frame members 16a of the frame 16 while a corresponding frame member 32 is secured to the other frame member 16a. The lower end portion of each of the frame members 32, 33 has an aperture in which there is mounted an annular member 34 having a circular cylindrical surface. In each member 34 there is provided a shaft mounting member 35 that eccentrically mounts the adjacent end portion of a shaft 36 relative member 34. A screw 37 is threaded into each mount 34 to bear against the eccentric mount 35 for retaining the mount 35 in an adjusted position, the screw 37 preferably extending into one of a plurality of angular spaced detents (not shown) provided in the exterior surface portion of member 35. A transverse intermediate portion of shaft 36 is extended through and supported by the lower end of a frame member 40, the upper end of the frame member 40 being attached to a transverse channel (not shown) that extends between and at its opposite ends is mounted by the frame members 32, 33. The annular portion 46 of the right subframe, generally designated 44, is pivotally mounted on the shaft 36 between frame members 33, 40 while the annular portion of the right-hand subframe is pivotally mounted on shaft 36 intermediate frame members 32, 40. The subframe 42 includes a pair of arms 47, 48 that are respectively rigidly connected to opposite end portions of annular member 46 to extend outwardly therefrom and to converge toward one another in a direction toward the right side of the vehicle. The opposite end portions or arms 47 and 48 are rigidly connected together by a transverse arm 49 (see FIG. 6). Mounted on arm 49 is a shaft 50 that rotatably mounts a right flanged guide wheel 51.

A left subframe 42 is generally of the same construction as subframe 44 other than its arms 47, 48 extend outwardly from its annular member 46 generally transversely in the opposite direction from that of the corresponding arms of the subframe 44. The guide wheel shaft 50 on the subframe 42 mounts a flange guide wheel 52; the guide wheels being mounted to rotate about axes parallel to the central axis of shaft 36 and spaced the same radial distance therefrom.

On each of the arms 49 (see FIG. 6) there is mounted a bearing member 55 that includes a metal mount 55a having a cylindrical bore with a central axis of elongation parallel to that of shaft 50, and an annular resilient member 55b having the end portion 56a of a stud shaft 56 extended therethrough. On each side of member 55b and abutting thereagainst is a metal washer 57, an annular flange portion of member 55b extending between the respective washer and the adjacent edge of mount 55a. A nut 58 is threaded on one end of shaft 56 to abut against the adjacent washer while the other washer 57 abuts against a shoulder formed at the juncture of shaft portions 56a and 56b. Shaft portion 56b is mounted on the adjacent diagonally extending portion 60a of the transverse load transfer member 60 that includes an intermediate portion 60b which generally extends between the arms 49 of the two front subframes when the guide wheels are in a rail engaging position.

It is to be noted that the shafts 56 at each end of member 60 are of the same construction and are mounted in the same manner other than that they extend axially in opposite directions with the axes of said shafts being coaxial. However, due to the provision of the resilient members 55b, for example the left arm 49 may be pivoted a limited amount about the axis of elongation of shaft 36 even though the right arm 49 remains stationary. That is the load transfer member 60 may pivot about the common axis of shafts 56 and at the same time, due to the resilient mounts 55b, each shaft 56 may pivot limited amounts relative member 55a about right angled axes that are in a plane perpendicular to the axis of elongation of shaft 56. Thus bearing member 55, to a limited extent, performs somewhat similar to a spherical bearing, and additionally due to resilient material between washers 57 and mount 55a, the shafts 56 may move transversely a small amount relative arms 49. This permits the straight line dimension between corresponding points on arms 49 being varied a limited amount as one subframe 42 pivots about shaft 36 relative subframe 44. In this connection, it is to be noted that annular members 46 are maintained in axially fixed positions on shaft 36. Through the above mentioned structure, the horizontal spacing of guide wheels 51, 52 is maintained even though the guide wheels are riding on rails at slightly different elevations, or the elevations of the rails vary relative one another.

An overcenter lock assembly, generally designated 64 (see FIG. 7), includes a clevis mount 65 that is pivotally connected at 66 to the transverse mid portion of the load transfer member 60 to pivot about an axis at right angles to the direction of elongation of said member. A tube 67 has one end fixedly connected to mount 65 to extend outwardly therefrom, the opposite end having a collar 68 of a larger outside diameter bolted thereto. An annular member 69 is slidably mounted on tube 67 axially intermediate collar 68 and mount 65, the annular member having a pair of coaxial stud shafts 70 extending transversely outwardly therefrom. Each of the stud shafts 70 pivotally extends into an aperture provided in the one end of the adjacent arm 71, annular member 69 being located between the one ends of the arms 71. The opposite ends of arm 71 are welded to a transverse channel 72; each end portion of the channel mounting a transverse shaft 73 which in turn is pivotally mounted by a bearing mount 74. Each bearing mount is secured to a bracket 75 of the framework that is mounted on the front end portion of the body frame 16.

Provided on tube (shaft) 67 to have one end portion bear against annular member 69 is a hold down coil spring 77, the opposite end of coil spring 77 bearing against the clevis mount 65. The coil spring constantly resiliently urges the annular member 65 toward the collar 68, i.e. away from the pivot axis of member 66; and in a guide wheel retracted position, retains member 69 against the collar. The spring characteristics are such to transfer a portion of the weight of the vehicle from member 69 to bracket 65, and also to provide a spring cushion as the vehicle travels over rails. In an overcenter lock position and the vehicle stationary, member 69 is intermediate collar 68 and bracket 65.

A sprocket 78 is mounted on the channel 72 to rotate the channel therewith, a chain 79 being extended around sprocket 78 and sprocket 80. Sprocket 80 is keyed to the shaft 81 of an angle gear box 82 that is mounted on plate 83 of the framework W. The gear box 82 has a shaft 84 with a handcrank 85 keyed thereto. Even though a handcrank 85 is illustrated, it is to be understood that a motor (not shown), preferably hydraulic, can be mounted on the framework for rotating the shaft 84 in the desired direction, or through other structure drivingly connected for rotating the sprocket 78 in the desired direction about the axes of shafts 73.

In order to limit the pivotal movement of the channel 72 in the direction of arrow 88 about the axes of shafts 73, the one end of a bar 89 is welded to the channel to extend outwardly therefrom in a direction at right angles to the direction of elongation of the channel. The bar is of a length to abut against the frame member 90 which extends between brackets 75 when the assembly 64 is in the overcenter lock position that will be set forth hereinafter.

The steering lock assembly, generally designated 86, includes a rod 87 having one end pivotally connected to a radial arm 76 welded to channel 72 and an opposite end pivotally connected to one end of the radial arm 88. The opposite end of arm 88 is keyed to the input shaft of an angle gear box 89 that is mounted on either the frame 16 or the framework, the output shaft of the box having a radial arm 90 keyed thereto. A link 91 has its opposite ends respectively, pivotally mounted by the opposite end of arm 90 and the one end of arm 92 which in turn has its opposite end keyed to longitudinal shaft 93. Brackets 102 are bolted to frame 16 to mount shaft 93 for pivotal movement adjacent pitman arm 22. A pair of axially spaced lugs 103 are welded to shaft 93 to extend radially outwardly therefrom to be in one position of shaft 93, out of the path of movement of arm 22; and in a second position, extend along either side of arm 22 to retain it in a position that wheels 18 are positioned for straight forward driving. The shaft 93 is rotated between its positions by the movement of arms 71 between the assemblies 64 highway travel position and rail travel position.

The structure of the front guide wheel assembly 11 having been set forth, the structure of the rear guide wheel assembly 12 will now be described. Referring to FIGS. 8-11 the rear wheel assembly includes a framework F fixedly attached to the rear portion of the body frame 16, framework F including transversely spaced frame members 94, 95 that are dependingly secured to frame 16. The lower end portion of frame members 94, 95 mount a transverse shaft 96 in a manner that frame members 32, 33 mount shaft 36. That is, the shaft 96 at each end is mounted in an eccentric member 97 that in turn is mounted by an annular mount 98, mount 98 being mounted by the frame members 94, 95 respectively. The intermediate portion of the shaft extends through an aperture in bracket 100 which in turn is dependingly secured to a channel 99 that at either end is welded to the respective frame members 94, 95.

The annular portion 105 of the left rear guide wheel subframe, generally designated 106, is pivotally mounted on shaft 96 intermediate members 95, 100 and retained in a fixed axial position on the shaft; while the annular member 107 of the right rear guide wheel subframe, generally designated 108, is pivotally mounted on shaft 96 in a fixed axial position intermediate members 94, 100. The subframe 106 includes a pair of arms 109, 110 that are respectively joined to opposite end portions of annular member 105 to extend convergingly rearwardly thereof, and transversely to the left side of the vehicle. The opposite end portions of arms 109, 110 are joined to the respective end of a short transverse arm 111 which mounts the shaft 112 forming a stub axle on which the left rear guide wheel 113 is rotatably mounted. The right rear guide wheel subframe 108 includes a pair of arms 114, 115 that are joined to opposite end portions of annular member 107 to extend convergingly rearwardly therefrom in a direction to the right-hand side of the vehicle, the opposite ends of the arms being joined together by a horizontal arm 116 that mounts a shaft 117. The shaft 117 forming a stub axle rotatably mounts the right gear guide wheel 118. Through the aforementioned structure, the guide wheels 113, 118 are mounted to rotate about axes parallel to the central axis of the shaft 96 that are equally spaced from the shaft 96.

An annular member 123 is pivotally mounted on a pivot member 122 between lugs 121 that mount pivot member 122. The lugs 121 are mounted adjacent the juncture of arms 110, 111 to extend outwardly to right angles to the direction of elongation of arm 110. A transversely extending tube 124 has one end portion welded to annular mount 123, the one end portion of a shaft 125 being slidably extended into tube 124. The opposite end portion of shaft 125 is slidably extended into a transverse tube 126 that has one end welded to an annular mount 127. Mount 127 is pivotally mounted on a pivot member 128 which in turn is mounted by and between a pair of lugs 129. The lugs 129 are mounted adjacent the juncture of arms 116, 114 to extend at right angles to the direction of elongation of arm 114. The shaft 125 intermediate the adjacent ends of tubes 124, 126 slidably extends through a load transfer bracket 130 which can pivot about the axis of the shaft. Bracket 130 has the overcenter lock mechanism, generally designated 131, pivotally connected thereto by a pivot member 132 of said assembly. The pivot axis of pivot member 132 extends at right angles to the center axis of shaft 125 and is spaced radially therefrom.

Since assembly 131 is of substantially the same construction as assembly 64, it will only be briefly described. The assembly 131 also includes a clevised bracket 136 that is pivotally mounted on pivot member 132 and to which there is fixedly attached one end of the tube (shaft) 138. An annular member 137 is slidably mounted on the tube and is resiliently urged toward the collar 139 through the hold down coil spring 140 that has its opposite ends abutting against members 136 and 137 respectively. The diametrically opposed stud shafts 141 that are attached to member 137 are pivotally mounted by the lower end portions of arms 142 to pivot about an axis parallel to the center axis of a transverse tube 143, the opposite end portions of the arms being welded to tube 143 to extend radially therefrom. The tube 143 is pivotally mounted on a shaft 144 that at its opposite ends is mounted by the frame members 145, 146 of the framework F at a substantially higher elevation and rearwardly of shaft 96.

Mounted on the tube 143 to extend radially outwardly therefrom and abut against the vehicle frame 16 when the assembly 131 is in its overcenter locked position is an arm 147; arm 147 limiting the movement of tube 143 in the direction of the arrow 148 to a position that the axis of shafts 141 have moved angularly past a straight line between the axes of shafts 144 and 125. Also fixedly mounted on the tube 143 is a sprocket 150 that is driven by a chain 151 which in turn is driven by a sprocket (not shown) on the output shaft (not shown) of the angle gear box 152. The input shaft 153 of the angle gear box 152 is rotated by a handcrank 154, although as mentioned with reference to assembly 11, the aforementioned input shaft may be driven by a hydraulic motor. The gear box 152 is mounted on the framework F.

Brackets 156 of the framework are provided to limit the pivotal movement of the subframes to the retracted position of FIG. 9.

Referring now to FIG. 12, a modified embodiment of the guide wheel assembly, generally designated 170, will now be described. The embodiment 170 includes framework M mounted on the body frame 16. The actual construction of the framework would depend on whether the assembly was to be mounted on the front end of the vehicle, or the rear end of the vehicle. However, for purposes of facilitating the description of the construction of the embodiment 170, it will be assumed as being mounted on the rear end of the vehicle frame 16. Further, for purposes of facilitating the description of embodiment 170, most of the parts that are of the same construction as that of embodiment 131 will be designated by the same reference numerals used for assembly 131.

The framework M includes frame members 94, 95 that mount a shaft 96 which in turn pivotally mounts the right subframe R and the left subframe L. The subframe L includes an annular portion 105 that is pivotally mounted on shaft 96 and a transverse arm portion 111; while subframe R includes an annular portion 107 pivotally mounted on the shaft 96 and a transverse arm portion 116. The rear guide wheels 113, 118 are respectively rotatably mounted on the arm portions 111, 116 of subframes.

A transverse shaft 174 is mounted by transversely spaced frame members 175 of the framework M to be at an elevation slightly below the vehicle frame. Keyed to shaft 174 to rotate said shaft is a tube 176 which has a sprocket 150 keyed thereto that is driven by a chain 151. Chain 151 in turn is driven by an angle gear box 152 in the manner described with reference to assembly 131. Further, a stop member 147 has one end portion welded to tube 176 to extend outwardly therefrom sufficiently to abut against frame 16 to limit the pivotal movement of shaft 174 in one direction.

Keyed to one end portion of the shaft 174 is a tube 178 that mounts the arms 142 of the overcenter lock assembly, generally designated 180. The overcenter lock assembly 180 is of the same construction as that of 131 other than it has a clevis member 181 that is pivotally connected at 182 to a lug 183. The lug 183 is welded to arm 111, the clevis member being connected to lug 183 to pivot about a transverse axis rather than being mounted to pivot about an axis perpendicular relative to the transverse axis such as was described with reference to assembly 131.

For the right rear guide wheel 118 there is provided an overcenter lock assembly, generally designated 190 that is of the same construction as overcenter lock assembly 180. Assembly 190 has radial arms welded to a tube 178 keyed to the opposite end portion of shaft 174 from that to which the corresponding tube of assembly 180 is keyed. Further, the clevis member 181 of assembly 190 is pivotally connected at 182 to a lug 183 that is welded to transverse arm 116. The pivot axes of both of pivot members 181 are parallel to shaft 96 and are spaced the same distance therefrom.

In using the guide wheel assemblies of this invention in a railroad track travel position, the guide wheels carry a substantial part of the weight of the vehicle. However, the bulk of the weight of the vehicle is carried by the vehicle wheels. It is important that sufficient weight be carried by the vehicle wheels in order to maintain the desired friction contact for both traction and braking operation which is obtained through the engagement of the vehicle wheels with the rails. At the same time, the guide wheels carry sufficient weight in order to maintain the vehicle relative the track that the wheels of the vehicle ride on the tracks and guide the vehicle around curves.

Due to the fact that vehicle frame and wheels are seldom perfectly aligned, if no suitable adjustment were provided, then one or more of the guide wheels would have its flange turned in to ride against the adjacent side portion of the rail. With reference to the embodiment of FIGS. 1-6, the aforementioned adjustment is obtained through providing the eccentrics 35 on the opposite ends of the shaft 36. That is, by loosening the screws 37 and turning the eccentrics 35, the shaft 36 is aligned to extend perpendicular to the rails when the vehicle is moving thereover; thereby preventing one or more of the guide wheel flanges from turning into the rail and riding on the adjacent side of the rail when moving over a straight section of a railroad track. After the eccentrics have been properly angularly positioned, screws 37 are again tightened to retain the shaft in an adjusted position. Similar type adjustments are obtained through the use of eccentrics for embodiments of FIGS. 7-11 and FIG. 12.

When the vehicle is traveling over the highway, the front wheel guide assembly is carried in the FIG. 4 position while the rear guide wheel assembly is in the FIG. 9 position. At this time, none of the weight of the vehicle is being carried by the front guide wheels, the spring 77 retaining the annular member 69 abutting against the collar. When the vehicle is to travel over railroad tracks, then the handcrank 85 is turned in the direction to rotate sprocket 78 in the direction of arrow 88. The resulting downward and rearward movement of the lower end portion of arms 71 is transferred through the spring 77 to the clevis mount 65 which forces the load transfer member 60 to be pivoted about shaft 36 in the direction of arrow 200. The continuing movement of channel 72 in the direction of arrow 88 results in the pivot axes of the channel 72 and shafts 56 being further vertically spaced; and the pivot axes of stud shafts 70 progressively approaching the straight line drawn between the pivot axes of channel 72 and shafts 56.

As the front guide wheels are moved into abutting engagement with the tracks, the combination of the radial dimensions of the non-flanged portion of the guide wheels, the axial dimension between the pivot axis of pivot member 66 and collar 68, and the dimension between shafts 70 and the center axis of channel 72 is greater than the vertical distance between the pivot axis of shafts 73 and the rails. As a result, the continued movement of channel 72 in the direction of arrows 88 results in the annular member 69 being moved away from collar 68 against the resilient action of spring 77. Accordingly, a portion of the weight of the vehicle is transferred through spring 77 to the clevis mount 65 and thence through the load transfer member to the flange guide wheels.

Channel 72 is rotated in the direction of arrow 88 until the pivot axis of shafts 70 cross over the centerline between the pivot axis of shaft 73 and that of the load transfer member shaft end portions 56; the bar 89 in abutting against frame member 90 limiting the amount of pivotal movement of channel 73 and thereby the angular movement of stud shafts 70 pass the overcenter lock position. The continuation of rotation of channel 72 in the direction of arrow 88 past the overcenter lock position results in the annular member 69 moving away from pivot 66 whereby spring 77 continues to urge members 69 to rotate arms 71 in the direction of arrow 88.

In the event that, for example, guide wheel 51 is brought into engagement with rail 13 prior to guide wheel 52 abutting against rail 14, then the continued movement of the channel 72 in the direction of arrow 88 results in the load transfer bar 50 pivoting in mount 55 generally in the direction of the arrow 201. This being permitted due to the resilient nature of member 55b. At the same time the load transfer member pivots about pivot member 66, and the load transfer member pivots about a longitudinal axis relative the guide wheel support frame for guide wheel 52. Additionally, due to flange portions of resilient members 55b extending between the annular mounts 55 and washers 57, the transverse distance between guide wheels 51, 52 remains the same even though one of the guide wheels is moved through a greater angular distance about shaft 36 than the other. Additionally, the weight transferred from the front end of the vehicle to the two guide wheels is substantially the same.

At the same time that the overcenter lock assembly 64 is being operated from the highway travel position to the guide wheel rail engaging position, the rotation of channel 72 in the direction of arrow 88, moves arm 76 in the same direction, this motion being transmitted through members 87-92 to rotate shaft 103 in a direction that lugs 103 are angularly moved in a direction to extend into the path of movement of pitman arm 22. It is to be understood that at this time the front wheels are in a straight ahead travel condition. At the time assembly 64 is in the overcentered, locked condition, one lug 103 extends on each side of arm 22 to prevent any substantial pivotal movement thereof.

In order to operate guide wheels from the overcenter locked position to the highway travel position, channel 72 is rotated in the direction opposite arrow 88 which initially forces member 69 downwardly and shaft 67 to rotate in a direction that the load transfer member shafts 56 turn about their axis in the direction opposite arrow 210. As channel 72 is rotated sufficiently that shafts 70 move across the overcenter lock position, shaft 67 continues to force the load transfer member to rotate shafts 56 in the direction opposite arrow 210, but at this time the annular member moves relative shaft 67 toward the collar 68. Still further rotation of channel 72 results in member 69 abutting against the collar and thereafter the subframes are pivoted about shaft 36 in the direction opposite arrow 200 to elevate the guide wheels. In the highway travel position the subframes extend predominantly horizontally and upwardly toward the axis of shafts 50, the shafts 50 are at a higher elevation than shaft 36 and horizontally are intermediate shafts 70 and 36, and shafts 70 are at an elevation vertically between that of shafts 73 and 50.

Also at the time channel 72 is rotated in the direction opposite arrow 88, shaft 93 is rotated to move lugs 103 from the FIG. 3 position to the FIG. 4 position.

In moving the rear guide wheels 113, 118 to a railroad track travel position, the handcrank 154 is rotated to rotate tube 143 in the direction of arrow 148. This results in the stud shafts 141 being moved downwardly and rearwardly and the rear guide wheels being moved closer to the rails. As the rear guide wheels are moved into abutting engagement with the rails, annular member 137 is moved against the action of spring 140 toward the axis of pivot member 132 and mount 130 pivots about shaft 125 in the direction of arrow 207. The handcrank is rotated until the tube 143 is moved in the direction of arrow 148 sufficiently that the common pivot axis of shafts 141 crosses the straight line between the pivot axis of tube 143 and the axis of shaft 125. At the time the tube 143 has been rotated in the direction of arrow 148 sufficiently to move stud shafts 141 in a slight angular amount past the overcenter position, bar 147 abuts against the frame 16 to prevent further angular movement of the tube 143 in the same direction. When the bar 147 abuts against frame 16, sufficient weight of the vehicle is transferred through the overcenter lock mechanism that annular member 137 is substantially spaced from collar 139 and bracket 136; but at the same time sufficient weight of the vehicle is supported by the vehicle wheels to give proper traction and driving action.

In the event that during operation of assembly 131 to its overcenter lock position, for example, rear guide wheel 113 abuts against rail 14 prior to the time the other rear guide wheel 118 abuts against rail 13, then continued movement of tube 143 in the direction of the arrow 148 results in the combination of tubes 124, 126 and shaft 125 being pivoted in direction of arrow 206 about the pivot axis of pivot member 122. Since this pivotal movement results in the transverse spacing between pivot members 122, 128 increasing, the edges of one or both of tubes 124, 126 that are adjacent bracket 130 are moved away from said bracket. This is possible since the shaft is axially slidably mounted by the tubes 124, 126 and the bracket 130 and the angles of pivot axes 122, 128 relative shaft 96. Accordingly, even though guide wheel 118 continues to pivot about the axis of shaft 96 and there is no corresponding pivotal movement of rear guide wheel 113, the transverse spacing between adjacent vertical surfaces of the guide wheels is not changed. In this connection it is to be noted that as tube 124 pivots in the direction of arrow 206 about pivot member 122, tube 126 pivots in the opposite direction relative pivot member 128. Due to the provision of the transverse load member 121–129 between arms 111 and 116 and mount 130, the downward force exerted on each of the rear guide wheels is nearly the same. At the same time each of the rear guide wheels can pivot about the axis of shaft 96 independently of one another.

The provision of independent pivotal movement of the rear guide wheels is further exemplified on an exaggerated scale in FIG. 10 wherein one rail is illustrated as being at a substantially higher elevation than the other. Thus, if there is a dip in for example one rail while the other extends at a constant elevation, the rear guide wheel 118 would continue to ride on the rail due to spring 140 and clevis bracket 136 forcing shaft 125 and tubes 124, 126 to pivot about pivot member 122 in a manner corresponding to that described in the preceding paragraph and shaft 138 moving downwardly relative member 137.

In order to operate guide wheels from the overcenter locked position to the highway travel position, tube 143 is rotated in the direction opposite arrow 148 which initially forces member 137 downwardly and shaft 138 to rotate about the axis of shaft 125 in a direction opposite arrow 207. As tube 143 is rotated sufficiently that shafts 141 move across the overcenter lock position, shaft 138 continues to rotate about shaft 125 in the direction opposite arrow 207, but at this time the annular member moves relative shaft 138 toward the collar 139. Still further rotation of tube 143 results in member 138 abutting against the collar and thereafter the subframes are pivoted about shaft 96 in the direction opposite arrow 205 to elevate the rear guide wheels. In the highway travel position the subframes 105, 106 extend predominantly horizontally and somewhat upwardly toward the axis of shaft 125, the shaft 125 is at a higher elevation than shaft 96 and at a lower elevation than shaft 144, and shafts 141 are at a higher elevation than shafts 96 and 144 and horizontally intermediate shafts 144 and 96.

Referring now to FIG. 12 the operation of the embodiment 170 will now be set forth. In order to move the guide wheels 113, 118 from their retracted highway travel position to a rail travel position, the handcrank is rotated in appropriate direction that tubes 176 and 178 and shaft 174 are rotated in the direction about the axis of shaft 174 to move the arms 142 of assemblies 180, 190 downwardly and rearwardly. As a result, each of assemblies 180, 190 operates in a manner similar to that described with reference to assembly 131 as the guide wheels move to engage the tracks. As each guide wheel engages the respective track, the continued downward and rearward movement of the respective set of arms 142 results in the adjacent spring 140 being compressed as the pivot shafts 141 of the respective assembly is moved progressively toward the overcenter lock position. Slightly after the time the stud shafts 137 have moved across the annular members a straight line between the axis of pivots 181 and the pivot axis of tubes 178, the bar 147 abuts against the vehicle frame 16 to prevent further movement of the tubes in the angular direction for moving the guide wheels toward the rail travel position. Since there is provided a separate overcenter lock assembly for each of the subframes L and R, there is no provision of a transverse connection between the horizontal arms 111, 116 thereof or the end portions of the subframes adjacent said arms. Additionally, the subframes L and R are free to pivot about the axis of shaft 96 independent of one another against the resilient action of the springs 140 and thus the guide wheels 113, 118, within limits, are able to follow the variations in the elevations of the rails independently of one another. The above in conjunction with the springs allow for irregularities in the track and swaying of the vehicle body while keeping the guide wheels on the track. This results in greater stability of the vehicle that is traveling over the railroad tracks and nearly constant even frictional contact being provided between the rails and the rear wheels.

It is believed that the retraction of assembly 170 is obvious from the description relative embodiment 131 and the preceding description of embodiment 170.

With reference to each of the embodiments, if the vertical distance between the respective front or rear end portion of the frame should, for example, increase the same amount with respect to both of the rails, both the guide wheels of the same assembly would relatively move downwardly to retain the guide wheels firmly against the rails due to annular members 69, 137 being slidable on the respective shafts 67, 138 and the action of the coil springs against the clevis bracket. At the same time, due to the pivotal mounting of the guide wheel subframes, the overcenter lock assemblies remain in an overcenter locked position.

Also, with reference to each embodiment in an overcenter locked, rail travel position, the subframes extend predominantly horizontally in a longitudinal direction and angled upwardly in a longitudinal direction from the axis of the guide wheel shafts toward the pivot axis of the pivot member connecting the subframes to the depending frame members of the framework. Further, the radial arms and the shafts 67, 138 respectively, are inclined at the maximum only a few degrees from the vertical. Thus, the portion of weight of the vehicle carried by the guide wheel assemblies is transferred generally vertically downwardly to a location closely adjacent the axis of rotation of the guide wheels and not through the pivot member that connects the subframes to the framework of assemblies 11, 12 and 170. Also the guide wheels are braced against fore and aft movement during rail travel through the above mentioned manner of mounting, i.e. by the subframes.

It is to be understood that through appropriate modification of the framework, any one of the guide wheel assemblies 11, 12 and 170 may be substituted for the other. That is, with appropriate modification of framework, the vehicle may be provided with the guide wheel assembly 11 or 12, or 170 at both front and rear of the vehicle frame; or through other appropriate modification of framework, any one of the guide wheel assemblies may be mounted on either the front and rear axles of the vehicle instead of on the vehicle frame as described herein. Thus, for example, the vehicle may have the guide wheel assembly 170 mounted on each of the front and rear axles (with appropriate modification of the framework). Of course, it is to be understood that if the assembly 11 is to be mounted on the rear of the vehicle, then the drive connection to the steering lock mechanism is eliminated while if one of the assemblies 12 and 170 is mounted on the front of the vehicle, then the connector link 87 is connected through a radial arm 76 to the tube 143 and 178 respectively to rotate therewith for moving the steering lock mechanism between its positions.

What is claimed is:

1. A guide wheel assembly for retaining the rubber tired support wheels of a highway vehicle on railroad tracks, comprising:
rigid frame means for attachment to the vehicle frame adjacent the support wheels,
a pair of widely spaced, flanged guide wheels for guiding along the railroad tracks adjacent the vehicle support wheels,
subframe means pivoted on said rigid frame means and mounting said guide wheels for upward and downward movement to permit alternate raising of the guide wheels off the tracks and lowering of the guide wheels to the tracks, said subframe means including a pair of individually movable subframes, each having a stub axle mounting a respective guide wheel and each subframe extending generally horizontally from the guide wheel to permit the guide wheel to move up and down to follow the undulations in the track, spring means bearing against the subframe means and continuously urging the guide wheels downwardly against the track while allowing upward movement of an individual wheel to follow the track undulations without lifting the other wheel, and operating means connected between the rigid frame means and the subframe means to lift the guide wheels off the tracks for highway travel.

2. The guide wheel assembly according to claim 1 and said spring means including a pair of springs each bearing against a respective subframe and continuously urging the guide wheels downwardly.

3. The guide wheel assembly according to claim 1 and said operating means including a single operating shaft connected to the subframe means to raise and lower both individually movable subframes and both guide wheels, and a single mechanical operator for turning said shaft.

4. The guide wheel assembly according to claim 1 and each of said subframes being mounted to swing about a horizontal axis extending transverse to the direction of travel whereby each of the guide wheels may move upwardly and downwardly and remain in the upright plane extending in the direction of travel and including the guide wheel, track, and the adjacent vehicle support wheel.

5. A guide wheel assembly for retaining the rubber tired support wheels of a highway vehicle on railroad tracks, comprising:

rigid frame means for attachment to the vehicle frame adjacent the support wheels, a pair of widely spaced, flanged guide wheels for guiding along the railroad tracks adjacent the vehicle support wheels, subframe means pivoted on said rigid frame means and mounting said guide wheels for upward and downward movement to permit alternately raising the guide wheels off the tracks and lowering the guide wheels to the tracks, said subframe means including a pair of individually movable subframes each having a stub axle mounting a respective guide wheel and each subframe extending generally horizontally from the guide wheel to permit the guide wheel to move up and down to follow undulations in the track, operating means connected between the rigid frame means and the subframe means to lift the guide wheels off the track for highway travel, said operating means including a two part articulated linkage connected between said frame means and said subframe means and swingable into and through a fully extended position and to an over-center position to lock the subframe means and guide wheels in their lowermost position with the guide wheels bearing against the track, one link of said articulated linkage being extendible and retractable, and a compression spring connected to the said extendible and retractable link and urging said link into extended position to continuously urge each of the subframes and guide wheels downwardly and against the railroad tracks.

6. A guide wheel assembly for retaining the rubber tired support wheels of a highway vehicle on railroad tracks, comprising:

rigid frame means for attachment to the vehicle frame adjacent the support wheels, a pair of widely spaced, flanged guide wheels for guiding along the railroad tracks adjacent the vehicle support wheels, subframe means pivoted on said rigid frame means and mounting said guide wheels for upward and downward movement to permit alternately raising the guide wheels off the tracks and lowering the guide wheels to the tracks, said subframe means including a pair of individually movable subframes each having a stub axle mounting a respective guide wheel and each subframe extending generally horizontally from the guide wheel to permit the guide wheel to move up and down to follow undulations in the track, spring means bearing against each of the subframes and continuously urging the guide wheels downwardly against the track while allowing upward movement of an individual wheel to follow the track undulations without lifting the other guide wheel, and operating means connected between the rigid frame means and the subframe means to lift the guide wheels off the track for highway travel, said operating means including a single operating shaft connected to the subframe to raise and lower both individually movable subframes and both guide wheels, and an overcenter locking linkage means connected between the shaft and both subframes to lock the subframes in lowered position with the guide wheels bearing against the tracks under pressure.

7. A guide wheel assembly for retaining the rubber tired support wheels of a highway vehicle on railroad tracks, comprising:

rigid frame means for attachment to the vehicle frame adjacent the support wheels, a pair of widely spaced, flanged guide wheels for guiding along the railroad tracks adjacent the vehicle support wheels, subframe means pivoted on said rigid frame means and mounting said guide wheels for upward and downward movement to permit alternately raising of the guide wheels off the tracks and lowering of the guide wheels to the tracks, said subframe means including a pair of individually movable subframes each having a stub axle mounting a respective guide wheel and each of said subframes extending generally horizontally from the guide wheel to permit the guide wheel to move up and down to follow undulations in the track, a connecting bar extending transversely of the direction of travel and between said individually movable subframes, and yieldable connections between the ends of said bar and said individually movable subframes to permit multi-directional movement of the bar relative to each of the subframes, spring means acting against said bar and thereby bearing downwardly against each of the subframes and continuously urging the guide wheels downwardly against the track while allowing upward movement of an individual wheel to follow the track undulations without lifting the other wheel, and operating means connected between the rigid frame means and the subframe means to lift the guide wheels off the tracks for highway travel.

* * * * *